United States Patent [19]

Arvidsson

[11] Patent Number: 4,785,540

[45] Date of Patent: Nov. 22, 1988

[54] DEVICE IN POWER-DRIVEN HAND TOOLS

[75] Inventor: Bengt Arvidsson, Huskvarna, Sweden

[73] Assignee: AB Electrolux, Stockholm, Sweden

[21] Appl. No.: 114,617

[22] Filed: Oct. 29, 1987

[30] Foreign Application Priority Data

Nov. 6, 1986 [SE] Sweden ................................ 8602214

[51] Int. Cl.⁴ ........................ B23D 57/02; B27B 17/00

[52] U.S. Cl. ........................................ 30/520; 30/381; 30/514; 173/170

[58] Field of Search ................. 30/520, 514, 517, 519, 30/518, 521, 522, 381, 382, 383; 16/110 R, 110 A, 111 R; 173/170; 51/170 R

[56] References Cited

U.S. PATENT DOCUMENTS 2,630,844 3/1953 Abbott et al. .

3,401,951 9/1968 Bloom ................................ 16/110 R

FOREIGN PATENT DOCUMENTS 2816485 10/1979 Fed. Rep. of Germany .

2909777 9/1980 Fed. Rep. of Germany .

3114906 10/1982 Fed. Rep. of Germany .

OTHER PUBLICATIONS

Applicants Disclosure, p. 2, lines 5 through 14.

*Primary Examiner*—Robert P. Olszewski
*Assistant Examiner*—Maurina Rachuba
*Attorney, Agent, or Firm*—Harness, Dickey & Pierce

[57] ABSTRACT

A device in power driven hand tools, preferably chain saws having a grip handle, and a bow handle mounted on top of the tool body. The grip handle is mounted for rotational movement about its support shaft. The bow handle is arranged to be pivoted around the tool body.

7 Claims, 3 Drawing Sheets

DEVICE IN POWER-DRIVEN HAND TOOLS

BACKGROUND OF THE INVENTION

The subject invention concerns a device for use in power-driven hand tools to hold and control the hand tool during operation thereof.

One example of a hand tool which is contemplated to be fitted with the device in accordance with the subject invention is the power saw or chain saw which is used in forest management e.g. for felling and for lopping off branches. In lopping operations which involve sawing off branches from felled, recumbent tree trunks it is necessary to direct the guide bar of the chain saw in such a manner that its plane is parallel with or extends along the trunk of the tree to ensure that minimum amounts of the knots or branches remain after the cutting operation. To ensure this guide bar position at all times the operator need either to shift his grip on the handles or twist his hands and/or arms in such a manner that he obtains the desired angle with respect to each individual knot or branch. If the operator choses the first possibility to work with the chain saw, he must perform a complicated manoeuvre which, if it is to be performed safely, requires that the operator puts down the saw on a support before he shifts his grip thereon. To alter the angle of hands and arms, the solution most commonly adopted for reasons of convenience, is extremely unsuitable because it prevents the operator from exercising adequate muscular strength and therefore lessens his ability to control the saw. This could have serious consequences, such as bodily injuries, in case the saw jams or jerks. From an ergonometrical viewpoint it is also unsuitable to work with the chain saw if the operator has to hold his hands and/or arms in abnormal positions, which in addition to giving the disadvantages mentioned above results in uncomfortable and tiring working positions which in turn may lead to work injuries, such as backaches and worn-out joints.

A chain shaw construction intended to make it possible to operate the chain saw without having to assume the hitherto necessary uncomfortable and unsuitable work positions is suggested in the Swedish Patent Application No. 8001841-9 (corresponding to DE-OS-No. 2 909 777). This publication describes a chain saw the front bow handle of which is pivotably mounted for movement about the longitudinal axis of the saw body and which comprises a mechanism by means of which the handle may be blocked in a number of different angular position. The rear grip handle together with the throttle control is, however, fixedly mounted to the body of the saw.

This construction does not constitute a significant improvement in safety since the saw operator still needs either to change his grip on the rear saw handle or else bend his wrist into an abnormal position. This prior-art construction also increases the load on the wrist since it is necessary, when pivoting the bow handle downwards, both to counteract the movement of the saw and to carry most of the weight of the saw by the hand holding the rear handle. Instead of reducing the risks of work injuries this constructions tends to increase the possible hazards. This is confirmed in research investigations carried out by the Swedish National Board of Industrial Safety. This research shows that the right hand, i.e. precisely the hand which normally manipulates the rear saw handle, is the one most frequently injured. This is essentially due to the very considerable number of bending movements of the load-carrying wrist that the right hand has to perform. The number of such bending movements evidently is increased considerably when using a chain saw constructed as taught in the Swedish Patent Application No. 8001841-9 referred to above, and consequently this teaching cannot be regarded to offer a satisfactory solution to the problems involved.

The purpose of the subject invention is to provide a power-driven hand tool in which the problems outlined in the aforegoing have been eliminated.

SUMMARY OF THE INVENTION

More precisely, these problems are solved in accordance with the teachings of the invention therein that the hand tool is equipped with a first grip handle in the form of a bow handle projecting from the hand tool, which first grip handle is arranged to be pivoted along at least one of the side faces of the hand tool, and with a second grip handle which is mounted on the hand tool for rotational movement about the longitudinal handle axis for the purpose of allowing the grip on this grip handle, once effected, to be retained irrespective of the angular position of the hand tool.

Further characteristics and developments of the inventive object will appear from the following description and the appended claims.

BRIEF DESCRIPTION OF THE DRAWINGS

The invention will be described in closer detail in the following with reference to the accopanying drawings, wherein a power operated chain saw has been chosen to exemplify the teachings of the invention. In the drawings.

DETAILED DESCRIPTION OF A PREFERRED EMBODIMENT

Figure 1:
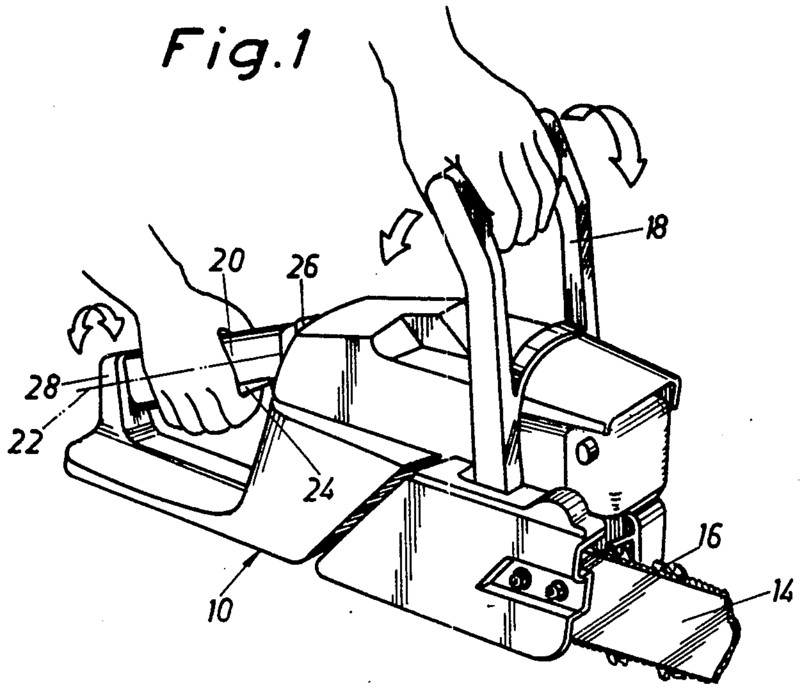
FIG. 1 is a perspective view of a part of a power-operated chain saw provided with handles in accordance with the invention.
Figure 2:
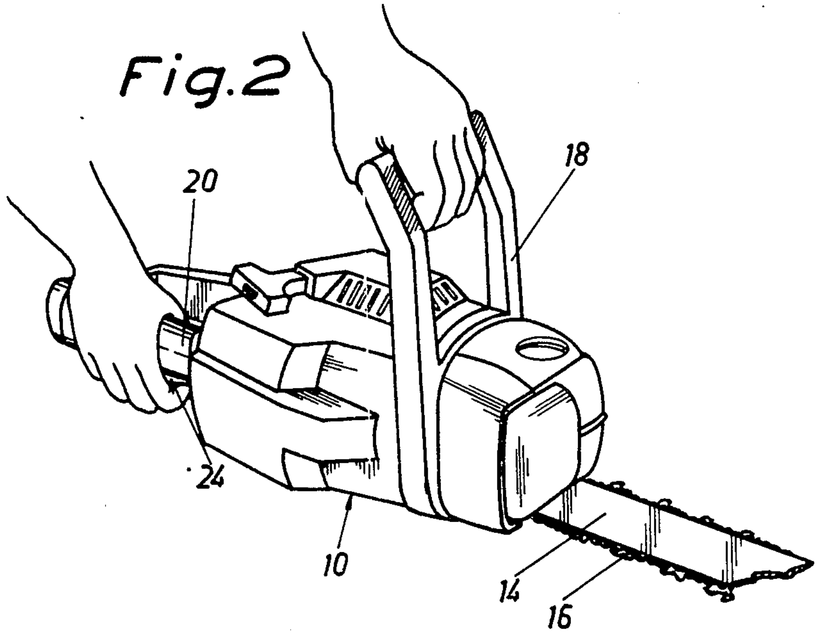
FIG. 2 is a view of the same chain saw as in FIG. 1 but shows the saw in a different angular position.

The hand tool in accordance with the invention is equipped with a grip handle 20 which is rotationally mounted on a shaft 22 for rotational movements about the latter between the handle attachement points 26, 28, and with a bow handle 18 which is pivotally mounted for pivotal movements relative to the body 12 of the chain saw 10, perpendicularly to the longitudinal direction of the saw body.

The grip handle 20 is equipped with a throttle control 24 which is connected to the motor 30 of the chain saw. The throttle control 24 should at all times assume such a position that independently of the rotational angle of the saw 10 the operator is able to regulate the speed of the motor 30. For this purpose the grip handle 20 in accordance with the invention is rotationally mounted in the manner described in the aforegoing.

Figure 3:
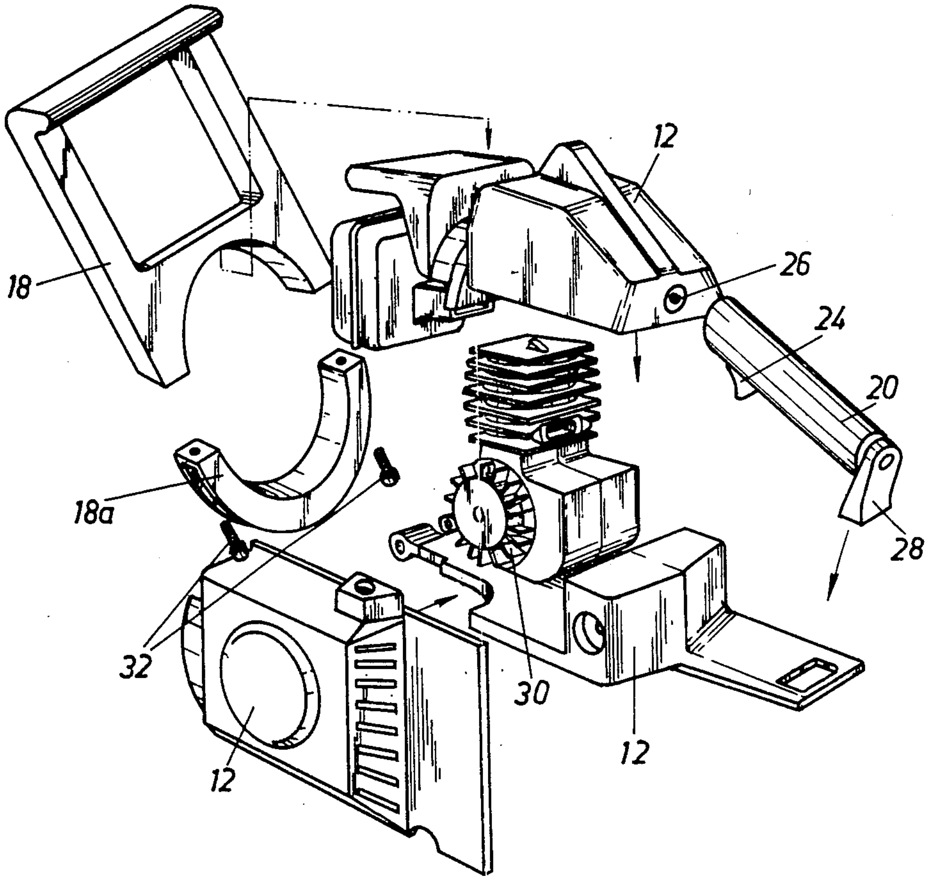
FIG. 3 is an exploded view of the body of a chain saw incorporating handles in accordance with the invention.

The bow handle 18 has an annular extension forming a loop which encircles the body 10 of the saw. This loop comprises two sections as appears from FIG. 3 in which figure are illustrated the bow handle 18 and its lower part 18*a*, the latter being attached to the handle part 18 by means of screws 32. A groove extends around the saw body 12 in which the annular extension of the bow handle 18 is received for movement.

The desired stability of the construction is achieved by mounting the bow handle 18 with friction in such a manner that a predetermined minimum force is required to turn the handle 18 in relation to the saw body 12. Mounting the handle in this way has the advantage that all positions in which the bow handle 18 is set is felt by the operator as being stable.

Figure 4:
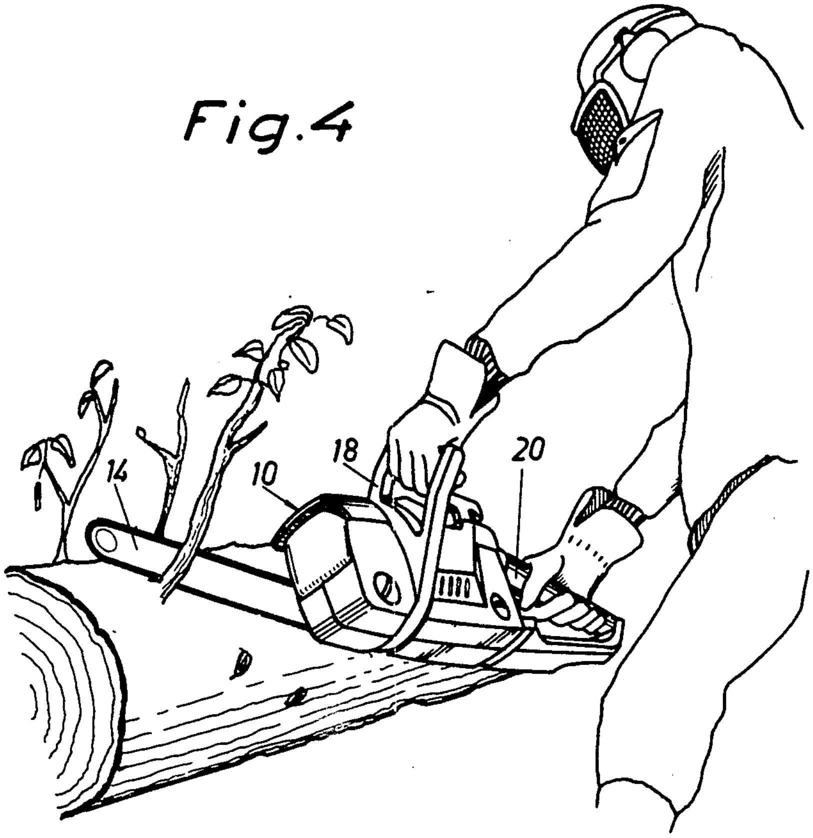
FIG. 4 shows one example of a position that the operator may assume when working with the chain saw in accordance with the invention.

FIG. 4 illustrates a chain saw operator involved in lopping off branches from a tree trunk with the aid of a power saw equipped with handles in accordance with the invention. The drawing figure illustrates clearly the advantage afforded by the pivotable bow handle 18 and the rotatable grip handle 20. When using a power saw 10 of conventional construction in the working position illustrated in FIG. 4 the operator would have had e.g. to twist the hand gripping the grip handle 20 in order to reach the throttle control 24, which would have resulted in an ergonometrically disadvantageous body position and impaired control over the comparatively dangerous work tool. By using a power saw 10 incorporating handles 18, 20 in accordance with the invention the saw may be turned freely during the performance of the job because of the absence of blocking means and the operator need not risk to let go of his grip about any one of the two handles 18, 20. Owing to this arrangement the operator is therefore allowed rapidly and at the same time comfortably to move the saw into the position which is correct for sawing off each individual branch without exposing himself to any unnecessary risks of injuring himself or of other hazards.

The embodiment of the invention described in the aforegoing is to be regarded as an example only and a number of other modifications and embodiments are possible within the scope of the appended claims. For instance, with the same advantages the invention is applicable not only to chain saws but also to hedge cutters, cutting machines, angle grinders machines and the like.

What I claim is:

1. An improved power driven hand tool having a body containing a driving motor and a tool driven by said driving motor, a handle arrangement to hold and control said hand tool during operation thereof, the improvement comprising said handle arrangement comprising a first grip handle in the form of a bow handle, said bow handle projecting from the hand tool and arranged to be pivoted about an exterior face of said hand tool body about a first pivot axis, and a second grip handle, said second grip handle being mounted on said hand tool for rotational movement about a longitudinal handle axis for the purpose of allowing the grip on said second grip handle to be retained irrespective of the angular position of said hand tool body relative to said first grip handle.

2. An improved power driven hand tool as claimed in claim 1, wherein said hand tool is a power driven chain saw, said chain saw comprising a saw bar projecting from the tool body, a saw chain travelling around said saw bar, the second grip handle comprising an elongate grip handle mounted at the end of said tool body opposite said saw bar and extending essentially in the lengthwise direction of said saw bar, and the bow handle projecting above said hand tool body transversely relative to the lengthwise direction of said hand tool, the improvement comprising said bow handle arranged for pivotal movement around at least one of the sides of said tool body, a shaft extending essentially in the lengthwise direction of said tool body, said second grip handle being mounted on said shaft for rotation between the attachment points of said shaft to said tool body, the rotational axis of said second grip handle not coinciding with the axis of pitvotement of said bow handle.

3. An improved power driven hand tool as claimed in claim 2, said bow handle is arranged for pivotal movement relative to said hand tool body under frictional resistance allowing continuous angular setting of said bow handle relative to said tool body.

4. An improved power driven hand tool as claimed in claim 2, wherein said rotational axis of said second grip handle extends at an angle relative to the pivot axis of said bow handle.

5. An improved power driven hand tool as claimed in claim 4, wherein said angle is less than 90°.

6. An improved power driven hand tool as set forth in claim 1 wherein a control for the drive motor is carried by the second grip handle and is rotatable with said second grip handle.

7. An improved power driven hand tool as set forth in claim 2 wherein a control for the drive motor is carried by the second grip handle and is rotatable with said second grip handle.

* * * * *